(No Model.)

A. J. KELLOGG.
TWO WHEELED VEHICLE.

No. 393,836. Patented Dec. 4, 1888.

Witnesses.
John C. Perkins
S. R. Burke

Inventor.
Andrew J. Kellogg.
Per Lucius C. West.
Atty.

UNITED STATES PATENT OFFICE.

ANDREW J. KELLOGG, OF RICHLAND, MICHIGAN.

TWO-WHEELED VEHICLE.

SPECIFICATION forming part of Letters Patent No. 393,836, dated December 4, 1888.

Application filed September 26, 1888. Serial No. 286,403. (No model.)

*To all whom it may concern:*

Be it known that I, ANDREW J. KELLOGG, a citizen of the United States, residing at Richland, county of Kalamazoo, State of Michigan, have invented a new and useful Two-Wheeled Vehicle, of which the following is a specification.

This invention relates to that class of two-wheeled vehicles the body or seat bars of which are hinged or jointedly supported at the forward end and are elastically supported over the axle; and it has for its objects the below described and claimed improvements, the principal feature of which is the employment of a semi-elliptical spring in a vertically-edgewise position, so that its action will be forward and back, instead of vertical, when the body swings up and down.

Figure 1:
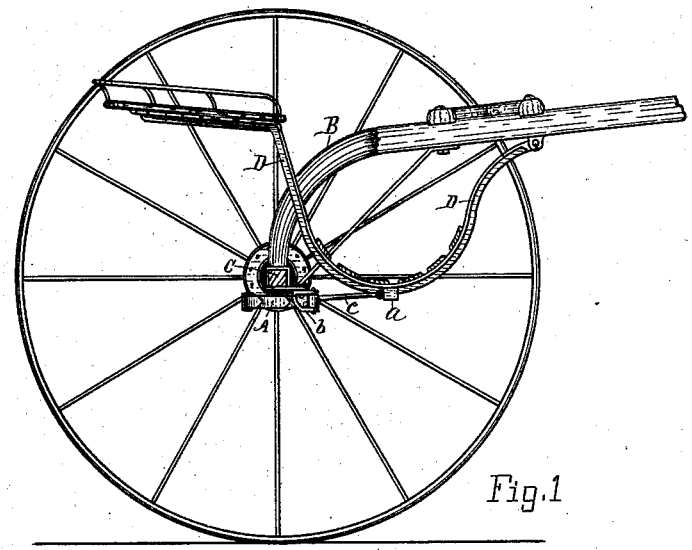
Figure 2:
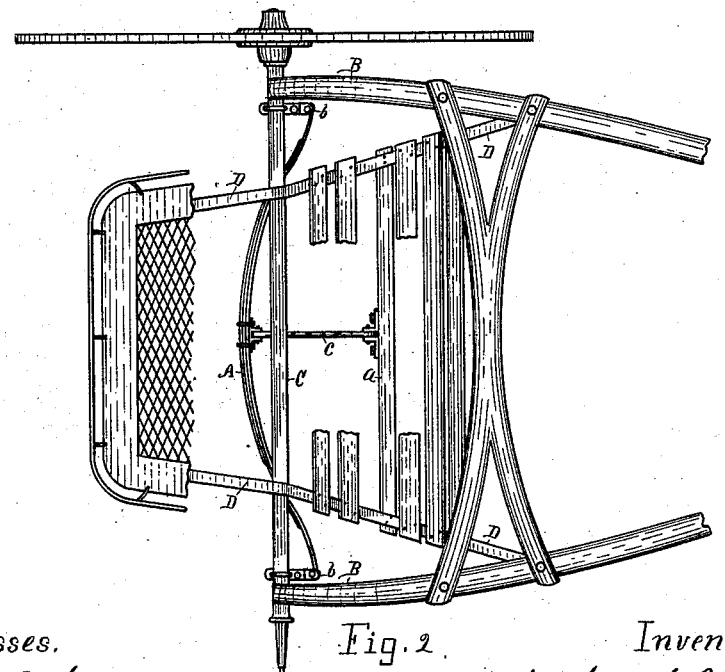

In the drawings forming a part of this specification, Figure 1 is a side elevation with one wheel removed, and Fig. 2 is a plan.

Referring to the letters marked on the drawings, D points out the body or seat bars, C the axle, and B the thills, as heretofore employed in such vehicles.

The semi-elliptical spring A is attached at each end to the shackles $b$. These shackles are pivotally attached to the axle C or some other suitable support which will allow the shackles to swing laterally to allow the spring to lengthen and shorten. The spring is in a vertically-edgewise position, so that looking at it in plan view, Fig. 2, we see the upper edge of the spring. At $c$ is a bar jointedly attached at one end to the center of the spring and jointedly attached at the other end to the body of the vehicle near the center. As here shown, the forward end of the bar $c$ is attached to a transverse bar, $a$, the latter bar $a$ being attached at the ends to the seat-bars D; but the body-bottom or one of the foot-slats will serve to attach the end of the bar $c$ to. When the body is borne down, the bar $c$ is drawn forward in a horizontal position, and this springs the bow of the spring forward, and when the body swings upward the reverse action of the spring takes place. By this means the action of the spring is perfectly natural and unrestrained by any cramping or abnormal strains upon it.

The construction is cheap, being composed of but a few simple parts, and presents an attractive appearance.

Having thus described my invention, what I claim as new, and desire to secure by Letters Patent, is—

In a vehicle, and in combination with the body thereof, a semi-elliptical spring in a vertically-edgewise position, and a jointed or flexible connection between the bow of the spring and body, whereby the action of the spring is horizontal, while the action of the body is vertical, substantially as set forth.

In testimony of the foregoing I have hereunto subscribed my name in presence of two witnesses.

ANDREW J. KELLOGG.

Witnesses:
   WILLIAM F. MONTAGUE,
   CLEMENT L. ROOSE.